United States Patent
Castleman et al.

(10) Patent No.: US 9,803,752 B2
(45) Date of Patent: Oct. 31, 2017

(54) SEAL ASSEMBLY

(75) Inventors: Larry J. Castleman, Monroeville, IN (US); Gregory D. Jones, Broomfield, CO (US); Brian Bowen, Fort Wayne, IN (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 583 days.

(21) Appl. No.: 13/526,232

(22) Filed: Jun. 18, 2012

(65) Prior Publication Data

US 2012/0313327 A1   Dec. 13, 2012

Related U.S. Application Data

(62) Division of application No. 12/200,362, filed on Aug. 28, 2008, now Pat. No. 8,215,646.

(51) Int. Cl.
*F16J 15/14* (2006.01)
*F16J 15/3236* (2016.01)
(Continued)

(52) U.S. Cl.
CPC ......... *F16J 15/3236* (2013.01); *F16J 15/166* (2013.01); *F16J 15/3212* (2013.01); *Y10S 277/928* (2013.01)

(58) Field of Classification Search
CPC ..... F16J 15/166; F16J 15/3212; F16J 15/3236
(Continued)

(56) References Cited

U.S. PATENT DOCUMENTS 2,843,434 A   7/1958   Orloff et al.
2,934,363 A   4/1960   Knox
(Continued)

FOREIGN PATENT DOCUMENTS

BE   1013672 A3   6/2002
DE   4223671 A1   1/1994
(Continued)

OTHER PUBLICATIONS

Bel Valves Variseal Assembly A1-A9. Datasheet. Telleborg Sealing Solutions, Aug. 27, 2007 [Provided by applicant on Jun. 18, 2012].*
(Continued)

*Primary Examiner* — Vishal Patel
*Assistant Examiner* — Thomas Neubauer
(74) *Attorney, Agent, or Firm* — Taylor IP, P.C.

(57) ABSTRACT

A sealing assembly for a shaft includes: a first sealing component; a first spring energizer associated with said first sealing component; an annular support member configured for supporting said first sealing component; a second sealing component; a second spring energizer associated with said second sealing component, said first and second sealing components each having a pair of seal lips, said pairs of seal lips facing each other, said first and second spring energizers each configured for energizing respectively said first and second sealing components, each said spring energizer being respectively between one said pair of seal lips, said annular support member being disposed about the shaft and positioned between said first and second sealing components and said first and second spring energizers, said annular support member including two outwardly facing protuberances each of which interfits with a respective said pair of seal lips.

5 Claims, 4 Drawing Sheets

(51) Int. Cl.
*F16J 15/16* (2006.01)
*F16J 15/3212* (2016.01)

(58) Field of Classification Search
USPC ....... 277/647, 589, 530, 567, 584, 552, 513, 277/928, 926
See application file for complete search history.

(56) References Cited

U.S. PATENT DOCUMENTS

| | | | |
|---|---|---|---|
| 3,114,561 A | 12/1963 | Creath et al. | |
| 3,223,426 A | 12/1965 | Reid | |
| 3,374,838 A | 3/1968 | Current | |
| 3,436,084 A | 4/1969 | Courter | |
| 3,512,789 A | 5/1970 | Tanner | |
| 3,790,180 A | 2/1974 | Heyn et al. | |
| 3,797,864 A | 3/1974 | Hynes et al. | |
| 4,390,186 A | 6/1983 | McGee et al. | |
| 4,410,189 A | 10/1983 | Myers | |
| 4,455,040 A | 6/1984 | Shinn | |
| 4,460,149 A | 7/1984 | Schaeper et al. | |
| 4,585,238 A | 4/1986 | Nicholson | |
| 4,585,239 A | 4/1986 | Nicholson | |
| 4,592,558 A * | 6/1986 | Hopkins | 277/572 |
| 4,618,154 A | 10/1986 | Freudenthal | |
| 4,706,970 A * | 11/1987 | Ramirez | F16J 15/3212 277/556 |
| 4,900,067 A | 2/1990 | Jansen et al. | |
| 5,088,745 A | 2/1992 | Peppiatt et al. | |
| 5,257,792 A | 11/1993 | Putch et al. | |
| 5,403,169 A | 4/1995 | Yokoi et al. | |
| 5,630,591 A | 5/1997 | Drijver et al. | |
| 5,720,503 A * | 2/1998 | Drijver | E21B 19/004 285/111 |
| 5,799,953 A | 9/1998 | Henderson | |
| 5,860,680 A * | 1/1999 | Drijver et al. | 285/95 |
| 6,007,070 A | 12/1999 | Heathcott et al. | |
| 6,719,262 B2 | 4/2004 | Whitby et al. | |
| 6,955,358 B2 * | 10/2005 | Iwakata et al. | 277/549 |
| 7,114,573 B2 | 10/2006 | Hirth et al. | |
| 7,341,258 B2 | 3/2008 | Holt et al. | |
| 7,401,788 B2 | 7/2008 | Williams et al. | |
| 7,959,159 B2 * | 6/2011 | Hocker | F02M 59/442 277/559 |
| 8,251,373 B2 * | 8/2012 | Lev | F16J 15/3236 277/442 |
| 8,393,400 B2 * | 3/2013 | Buckle | E21B 33/04 166/368 |
| 9,599,226 B2 * | 3/2017 | Putkowski | F16J 15/064 |
| 2006/0103076 A1 | 5/2006 | Hashimoto | |
| 2007/0052181 A1 * | 3/2007 | Nakamura | F16J 15/166 277/584 |
| 2007/0158917 A1 | 7/2007 | Paykin | |
| 2007/0222162 A1 * | 9/2007 | Stoner | F16J 15/166 277/589 |
| 2008/0053305 A1 * | 3/2008 | Struschka | B60T 11/228 92/24 |
| 2009/0108542 A1 * | 4/2009 | Jordan | F16J 15/3208 277/589 |
| 2009/0230630 A1 | 9/2009 | Kondo et al. | |
| 2011/0140369 A1 * | 6/2011 | Lenhert | F16J 15/3216 277/589 |
| 2011/0260411 A1 * | 10/2011 | Smith | 277/630 |

FOREIGN PATENT DOCUMENTS

| | | |
|---|---|---|
| EP | 1 884 691 A1 | 2/2008 |
| EP | 2 159 459 A1 | 3/2010 |
| EP | 2 253 870 A2 | 11/2010 |
| EP | 2 287 499 A2 | 2/2011 |
| EP | 2 253 870 A3 | 9/2011 |
| EP | 2 287 499 A3 | 9/2011 |
| GB | 738055 | 10/1955 |
| GB | 1049877 | 11/1966 |
| GB | 1100508 | 1/1968 |
| WO | 2006/064255 A1 | 6/2006 |

OTHER PUBLICATIONS

Variseal Assemblies B1-B23. Datasheet. Telleborg Sealing Solutions, Aug. 27, 2007 [Provided by applicant on Jun. 18, 2012].*
Variseal Assembly C. Drawing. Telleborg Sealing Solutions, Aug. 27, 2007 [Provided by applicant on Jun. 18, 2012].*
Communication dated Jun. 29, 2012 from European Patent Office for Application No. EP 09 010 837.4-2422 (4 pages).
Communication dated Jun. 8, 2012 from European Patent Office for Application No. EP 10 009 061.2-2422 (5 pages).
Communication dated Jun. 14, 2012 from European Patent Office for Application No. EP 10 011 008.9-2422 (3 pages).
Office Action of European Patent Office dated Apr. 6, 2011 for Application No. EP 09 010 837.4-2422 (3 pages).
Communication dated Jan. 18, 2010 from European Patent Office for European Patent Application No. EP09010837.4-2422 including European Search Report (dated Jan. 4, 2010) and European Search Opinion (6 pages).
European Search Report dated Aug. 16, 2011 for European Patent Application No. 10 01 1008 (7 pages).
European Search Report dated Aug. 17, 2011 for European Patent Application No. 10 00 9061 (7 pages).
European Search Report dated Jan. 18, 2010 for European Patent Application No. 09010837.4-2422 (7 pages).
Communication dated Jun. 3, 2013 from European Patent Office for European Patent Application No. 10 009 061.2-1754 (31 pages).
Communication dated May 8, 2013 from European Patent Office for European Patent Application No. 10 011 008.9-1754 (30 pages).

* cited by examiner

SEAL ASSEMBLY

CROSS REFERENCE TO RELATED APPLICATIONS

This is a division of U.S. patent application Ser. No. 12/200,362, entitled "SEAL ASSEMBLY", filed Aug. 28, 2008, now U.S. Pat. No. 8,215,646 which is incorporated herein by reference.

BACKGROUND OF THE INVENTION

1. Field of the Invention

The present invention relates to sealing systems, and, more particularly, to multi-piece sealing assemblies.

2. Description of the Related Art

Oil drilling devices typically include an arrangement or drill head that is located underground or "down hole" that is in a highly unique environment. The pressures and temperatures are typically, both high at over 15,000 psi and potential temperatures of approximately 400° F. The drill head and system utilize hydraulic fluid on one side and drilling mud (a lubricant and abrasive) on another. Sealing systems between the two fluids unfortunately require regular maintenance. Reliability of the sealing system is of paramount concern, because of the cost of downtime in the drilling operation in the retrieval of the underground drilling head and seal. Additionally, when installed the sealing systems must be able to be sealed in both directions, (e.g. there are times when either the hydraulic fluid or drilling mud is pressurized to a higher state than the other). Prior sealing systems have been susceptible to wear and degradation as contaminants, abrasive media, and debris enter the sealing area. Prior sealing systems have also required a larger area to accommodate two uni-directional seals in separate grooves in the hardware. This has increased the weight and space required, increased the overall cost of the system, and has not provided necessary sealing performance for the expected duration due to eventual pressure build-up between the two seals eventually destroying the seals.

What is needed in the art is a bi-directional sealing assembly configured for operating in high-pressure and high-temperature environments.

SUMMARY OF THE INVENTION

The present invention provides a bi-directional sealing assembly configured for operating in high-pressure and high-temperature environments.

The invention in one form is directed to a sealing assembly for a shaft. The sealing assembly includes a sealing component, a first ring, a second ring, and at least one energizer. The first ring is annularly disposed about the shaft, the first ring having at least one first protuberance interfittable with the sealing component. The second ring is annularly disposed about the shaft in facing opposition to the first ring, the second ring having at least one second protuberance interfittable with the sealing component. The at least one energizer energizes the seal component, the at least one energizer being adjacent the at least one first protuberance or the at least one second protuberance.

The invention in another form is directed to a sealing assembly for a shaft. The sealing assembly includes a first sealing component, a first spring energizer, and an annular support member. The first spring energizer is associated with the first sealing component. The annular support member is configured for supporting the first sealing component. The sealing assembly is configured for being disposed in a single gland, groove, and or space of a housing and for sealing in two axial directions in the single gland, groove, or space and thereby configured for providing bi-directional sealing in a high-pressure seal operational area.

The invention in yet another form is directed to a sealing assembly for a shaft. The sealing assembly includes a first sealing component, a first spring energizer, and an annular support member. The first spring energizer is associated with the first sealing component. The annular support member is configured for supporting the first sealing component. The sealing assembly is configured for being disposed in a single gland, groove, and or space of a housing and for sealing in two axial directions in the single gland, groove, or space and thereby configured for providing bi-directional sealing in a high-pressure seal operational area. The sealing assembly further includes a second sealing component and a second spring energizer associated with the second sealing component, the first and second sealing components each having a pair of seal lips, the pairs of seal lips facing each other, the first and second spring energizers each configured for energizing respectively the first and second sealing components, each spring energizer being respectively between one said pair of seal lips, the annular support member being disposed about the shaft and positioned between the first and second sealing components and the first and second spring energizers, the annular support member including two outwardly facing protuberances each of which interfits with a respective pair of seal lips.

The invention in yet another form is directed to a sealing assembly for a shaft. The sealing assembly includes at least one spring energizer, an elastomeric material deposited within the spring energizer, and a sealing component, the at least one spring energizer configured for energizing the sealing component. The sealing component includes a first arcuate portion and a second arcuate portion. The first arcuate portion is annularly disposed about the shaft, the first arcuate portion substantially contacting the spring energizer. The second arcuate portion is reversed from the first arcuate portion, is annularly disposed about the shaft, and substantially contacts the spring energizer. A space between the first arcuate portion and the second arcuate portion is substantially filled with said spring energizer and said elastomeric material.

An advantage of the present invention is that it provides a sealing assembly suitable for high-temperature and high-pressure environments with bi-directional pressure.

Another advantage of the present invention is that it is suitable for aggressive application environments such as static, rotational, or reciprocating uses in combination with abrasive media.

Another advantage of the present invention is that it is suitable for oil and gas environments and other environments as well.

Yet another advantage of the present invention is that it provides a sealing assembly that includes at least two energized (particularly spring energized) seal lips able to be installed into a single groove. Pressure, potentially in the backside of a spring energized seal, can cause seal springs to collapse, but the sealing assembly of the present invention prevents such permanent deformation.

Yet another advantage of the present invention is that the system assembly is automatically self-actuating as the springs control seal lip pressures and seal system pressure relief by causing backup ring movement, or, in an alternative embodiment, seal ring movement.

Yet another advantage of the present invention is that the seal assembly is provided with various vent channels or passageways that permit the seal assembly to vent and self-clean as contaminants are removed from the vicinity of the seal assembly via transport through the vent channels.

Yet another advantage of the present invention is that the seal assembly includes a smaller footprint than other downhole sealing assemblies, while at the same time permitting sealing of a range of pressures from 0 psi to greater than 15000 psi and a range of temperatures well below 0 degrees Fahrenheit to greater than 400 degrees Fahrenheit.

Yet another advantage of the present invention is that the combination of spring bias seals and protuberances create less friction as pressure trapping is substantially prevented.

Yet another advantage of the present invention is that the seal assembly permits sealing in a bi-directional geometry based on the applied pressures.

Yet another advantage of the present invention is that the seal assembly is disposed in a single gland, groove, or space.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
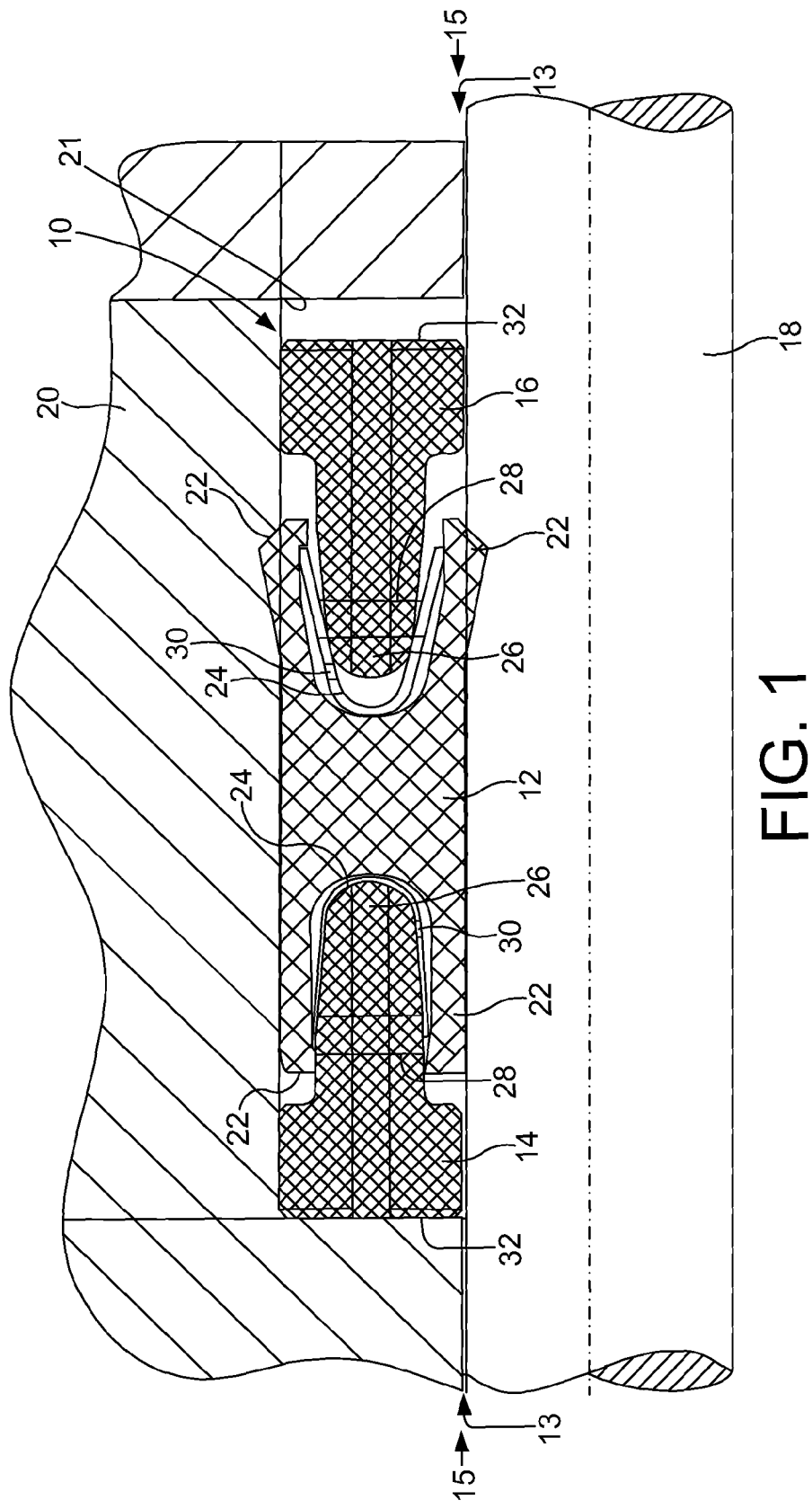
FIG. 1 is a sectional view of an embodiment of the sealing assembly according to the present invention.

Referring now to the drawings, and more particularly to FIG. 1, there is shown an embodiment of a sealing assembly of the present invention, the sealing assembly of this embodiment labeled as 10. Sealing assembly 10 generally includes a sealing component 12, a first backup ring component 14, and a second backup ring component 16. In the fully assembled or packaged form of assembly 10, sealing component 12, ring 14, and ring 16 are disposed annularly about a shaft 18 in facing abutting relationship to one another so as to encase and interfit with sealing component 12. Rings 14 and 16 have complementary protuberance mating features 26 that form a tang, or member, that interfits with sealing component 12.

In this manner, the arrangement of rings 14 and 16 serves to prevent seal collapse of sealing component 12 between the shaft 18 and housing 20. Assembly 10 may be considered to form a kit having a collection of discrete, individual, separable pieces that can be detachably connected or organized into a pre-packaged sealing unit ready for installation into a single groove, gland or space 21 of housing 20.

The sealing component 12 of FIG. 1 is provided in the form of a generally cylindrical sleeve having two pairs of outwardly facing seal lips 22, one pair of lips 22 on one side of sealing component 12 and the other pair of lips 22 on the opposite side of sealing component 12, the pairs of seal lips 22 facing away from each other. In between each pair of seal lips 22, there is disposed an energizer 24, such as a spring energizer 24, to bias each seal lip 22 away from its paired twin. Although FIG. 1 shows each of the seal lips 22 to be of the same shape and construction relative to each other, that need not be the case. The inner surface of seal member 12 and spring energizer 24 has a complementary bore-like construction suitable to serve as a bearing surface for interfitting with a protuberance 26 of one of backup rings 14 and 16, respectively.

The projections or protuberances 26 are disposed at proper axial locations so that both rings 14 and 16 have sufficient annular clearance to be fully seated on shaft 18 and have clearance to move into and out of the space between each respective pair of seal lips 22. In most cases, the protuberance and spring pair may be able to substantially fill the space between each respective pair of seal lips 22. To prevent pressure trapping, protuberances 26 include crosscut interconnecting bores 28 to relieve pressure at proper times during operation. Each radial bore 28 in FIG. 1 is shown by two vertical lines running from an upper surface to a bottom surface of a respective protuberance 26. Each axial bore 28 in FIG. 1 is shown by two horizontal lines. Additionally, each spring energizer 24 may include similar through bores 30 for pressure relief. The backup rings 14, 16 with protuberances 26 may be provided in any suitable form, construction, or material composition adapted to serve the above purposes. For instance, each backup ring 14 and 16 can be made of a polymer or metal. The protuberances 26 may be formed integrally with the backup ring structure or affixed thereto as a separate piece. Backup rings 14, 16 may on their outward side include additional notches 32 across their face surface for pressure relief.

Sealing component 12, having sealing lips 22, may seal both between housing 20 and shaft 18, in one direction, and alternatively, when pressure is relieved or reversed, bear up on protuberances 26. As pressure conditions warrant, pressure may be relieved between seal component 12 and backup rings 14, 16 via venting of pressure through bores 28 and 30, and notches 32.

Thus, in this embodiment of the present invention, sealing assembly 10 includes an annular seal member 12 having two pairs of sealing lips 22 on opposite sides thereof. Springs 24 are located within each pair of lips 22 to outwardly bias each of the lips 22 from its paired twin. The seal assembly 10 includes two annular support members or backup rings 14, 16 having a protuberance 26 that complementarily substantially fits into the space between each pair of sealing lips 22. The backup rings 14, 16, while preventing seal lip 22 collapse, also include crosscut through passageways 28 for pressure relief.

Additionally, rings 14 and 16 along with sealing component 12 may be keyed (not shown) to prevent relative rotation therebetween.

In alternate forms, seal component 12 may be formed of two seal elements connected or attached together to form substantially the geometry described and shown in FIG. 1. In another form of the invention, the arrangement for holding, gripping, or fastening the rings 14, 16 together may include other shapes than a simple toroidal protuberance. An advantage of the present invention is that the mechanism for detachably joining the parts together employs matable features that are carried by the respective rings and therefore does not require any external fastening devices, such as bolts or screws. Once assembled, the combination of seal component 12 and annular rings 14, 16 is in its fastened state and ready for installation, without the need for any further retrofitting or modifications.

Shaft 18 of FIG. 1 exhibits axial displacement. That is, shaft 18 can move both left and right in the page of FIG. 1. Alternatively or in addition thereto, shaft 18 can rotate. Seal assembly 10 of FIG. 1 is a rod-type seal. The present invention, however, can be used in piston-type seals as well. Further, system pressure, such as via fluid, is exerted on both the left and right sides of seal assembly 10 via fluid flowing through gap 13 formed between shaft 18 and housing 20. Such system pressure is denoted by arrows 15. While arrows 15 are shown as exerting pressure towards seal assembly 10, it is understood that system pressure can be directed away from seal assembly 10 and further that the system pressure from the left side can be greater than the system pressure from the right side, or vice versa. That is, the system pressure on the left and right sides can vary in amount relative to each other. This is the case in each of the embodiments of the present invention. The system relative to system pressure is the system which includes shaft 18, housing 20, and seal assembly 10.

In use, system pressure in gland 21 can cause seal assembly 10 to move within gland 21. Depending on the pressure from the left and right sides of seal assembly 10, sealing component 12 and backup rings 14 and 16 can slide within gland 21 and to a varying degree relative to one another, as indicated in FIG. 1. That is, seal assembly 10 can shuttle back and forth in groove 21 when pressure direction changes. Further, bores 28 and holes 30 are configured to release pressure that may build up in portions of gland 21. For instance, in FIG. 1, if pressure begins to build up in the cavity formed by backup ring 16 and the right-side spring energizer 24, bore 28 in the right-side protuberance can permit movement of pressurized fluid from that bottom cavity to a similar cavity formed in part by the upper side of protuberance 26 of backup ring 16, thereby relieving pressure in that bottom cavity. By providing sealing relative to the left side of seal assembly 10 (which can be the upstream side) and/or to the right side of seal assembly 10 (which can be the downstream side), as well as to the upper portion of seal assembly 10 and to the bottom portion of seal assembly 10, seal assembly 10 provides bi-directional sealing in high-pressure and/or high-temperature environments.

Figure 2:
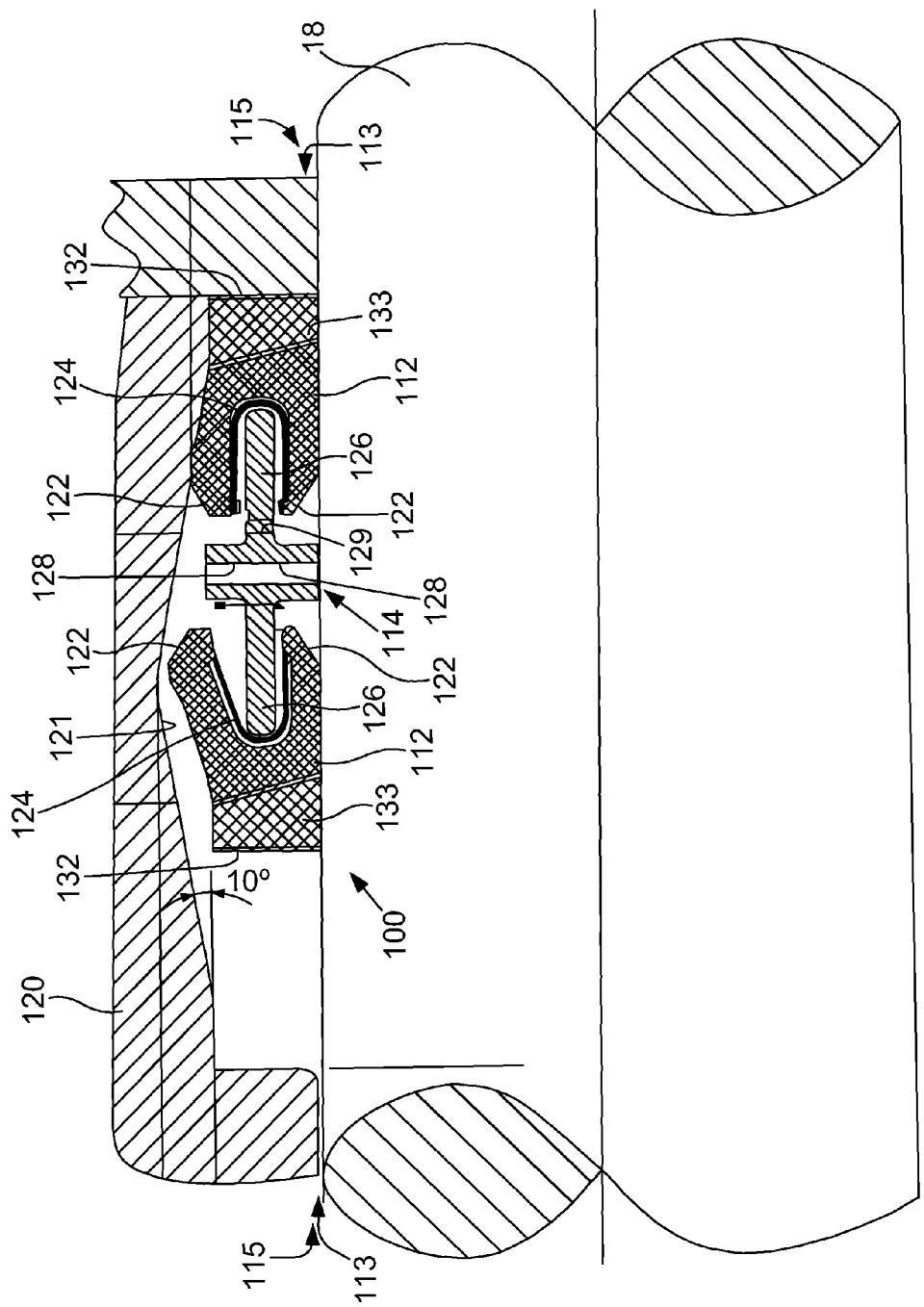
FIG. 2 is a sectional view of another embodiment of the sealing assembly according to the present invention.

Referring now to FIG. 2, there is shown an embodiment of the sealing assembly of the present invention, the sealing assembly of this embodiment labeled as 100. FIG. 2 shows sealing assembly 100 in an assembled condition. Sealing assembly 100 is essentially a mechanical inverse of the embodiment of FIG. 1. Sealing assembly 100 generally includes two seal components 112 each having a pair of seal lips 122 with a respective spring energizer 124 therebetween. Sealing assembly 100 also includes a backup member 114. The pairs of seal lips 122 of the two seal components 112 face each other, with backup member 114 located therebetween.

Backup member 114 includes two oppositely facing protuberances 126. Each protuberances 126 interfits into a respective pair of seal lips 122 and thereby operates to prevent the collapse of a respective sealing component 112 and pair of seal lips 122 and to permit the release of pressure associated with seal assembly 100. Backup member 114 is provided with a plurality of crosscut and intersecting bores 128 for such pressure relief (only one such bore 128 is shown in FIG. 2). Bores 128, formed in backup ring 114, can extend radially through annular backup ring 114 (as shown in FIG. 2) and are spaced apart in circumferential direction from one another through annular backup ring 114. Backup ring 114 can have four, for example, such bores (or vent holes) 128. Backup ring 114 may also include one or more through-bores 129 in the right-side protuberance 126, as shown by the two vertical lines in that protuberance 126. The left-side protuberance 126 may include a similar such bore 129 (not shown). Bores 129 may alternatively be formed at other places on protuberances 126. Further, The outward side of each seal components 112 can include notches 132 for pressure relief, as well as potential structure 133 for conventional backup rings, which may be of the same but preferably different and harder material than seal components 112. Alternatively, the outward side of each structure 133 can include such notches 132. Eight such notches 132, for example, can be included. Further, as shown in FIG. 2, gland 121 need not be square or rectangular in shape for proper operation. Further, housing 120 may define gland 121 such that gland 121 has an enlarged center section, set off possibly up to 15 degrees, but most preferably set off 10 degrees (as indicated in FIG. 2), from parallel to shaft 18.

Thus, in this embodiment of the present invention, sealing assembly 100 is substantially the mechanical inverse of the first embodiment of the present invention (described above and shown in FIG. 1) in which annular support member 114 includes outwardly facing protuberances 126 that substantially interfits with spring biased C-shaped sealing members 112, each of which can have a backup ring 133. Protuberances 126 function in substantially the same way as the first embodiment and thus prevent seal collapse. The gland 121 in which seal assembly 100 fits may be shaped such that it is not simply a square groove, but includes other shapes to assist in sealing and pressure release. FIG. 2 shows gland 121 having a raised center section, which assists in pressure release.

In use, shaft 18 of FIG. 2 can move axially back and forth (and/or alternatively rotate). System pressure in gland 121 can cause seal assembly 100 to move within gland 121. Depending on the system pressure 115 from the left and right sides of seal assembly 100 via gap 113 formed by housing 120 and shaft 18, sealing components 112 and backup ring 114 can slide within gland 121 and to a varying degree relative to one another, as indicated in FIG. 2. That is, seal assembly 100 can shuttle back and forth in groove 121 when pressure direction changes. Further, bores 128 and 129 are configured to release pressure that may build up in portions of gland 121. Further, as seal assembly 100 slides to the right side of gland 121 (as shown in FIG. 2), a gap can be formed between the center section of gland 121 and an upper lip 122 of the left sealing component 112, thereby allowing fluid to flow over that upper lip 122 and possibly down through bore 128 to thereby release pressure build-up. By providing sealing relative to the left side of seal assembly 100 or to the right side of seal assembly 100, as well as to the upper portion of seal assembly 100 and to the bottom portion of seal assembly 100, seal assembly 100 provides bi-directional sealing in high-pressure and/or high-temperature environments.

Figure 3:
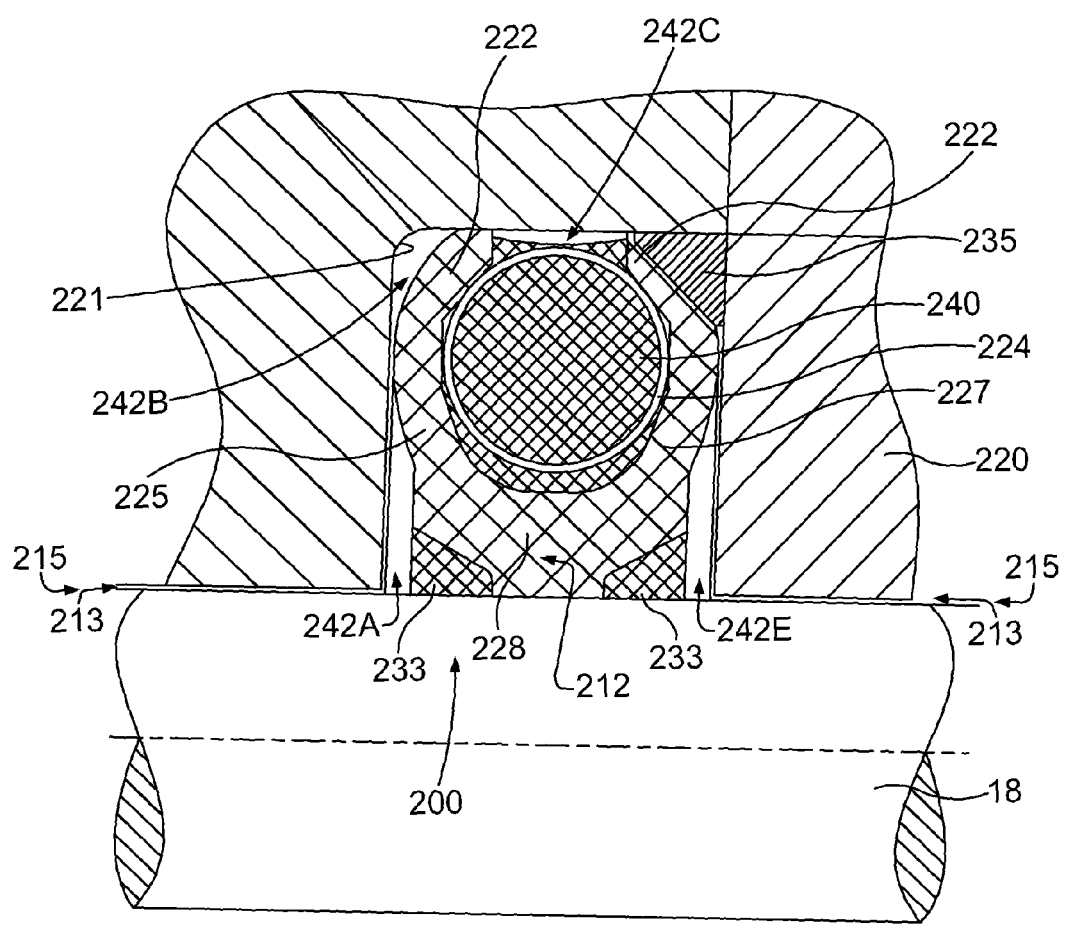
FIG. 3 is a sectional view of yet another embodiment of the sealing assembly according to the present invention.
Figure 4:
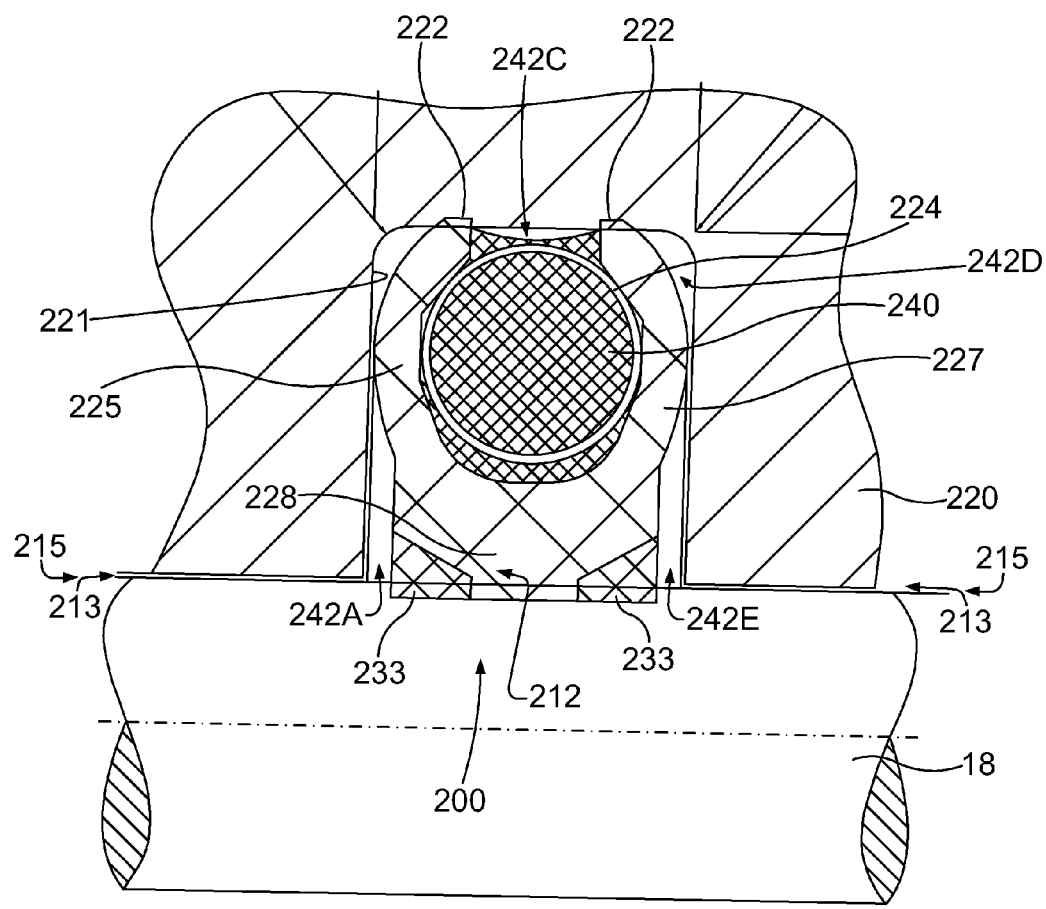
FIG. 4 is a sectional view of yet another embodiment of the sealing assembly according to the present invention.

Referring now to FIGS. 3 and 4, there are shown two additional embodiments of the sealing assembly of the present invention, the sealing assembly of each of these embodiments being labeled as 200. Each of the embodiments of sealing assembly 200 shown in FIGS. 3 and 4 generally includes a sealing member 212, backup ring portions 233, a spring energizer 224, and can include a filler 240 made of elastomeric material. Sealing member 212 includes a single pair of lips 222 about a single coil spring energizer 224. Sealing member 212 and lips 222 are connected by first and second arcuate portions 225, 227 annularly disposed about the shaft 18 and connected and most preferably integrally formed with seal member 212. The arcuate portions 225, 227 are oppositely shaped and substantially contacting or surrounding or entrapping coil spring or spring energizer 224.

Elastomeric material 240 is interfilled within spring energizer 224 to prevent seal collapse during high pressure operations. In most embodiments, elastomeric material may also substantially fill the space between arcuate portions 225, 227. Elastomeric material 240 may be constructed from conventional elastomeric materials, such as rubber or other compounds. Backup ring portions 233 may be formed in seal member 212 from conventional backup ring materials as is known in the art and bonded in known ways to seal member 212. As shown in FIG. 3, an additional backup ring 235 may be formed in at least one corner of seal member 212 for split glands (ring 235 shown in the upper right corner of the seal groove in FIG. 3), for additional strength and stability without negatively affecting seal performance. Elastomeric portions may be drilled, cut out, or never formed (not shown) in spring energizer 224 area to permit pressure equalization on reverse pressure flow.

In use, shaft 18 of FIGS. 3 and 4 can move axially back and forth (and/or alternatively rotate). System pressure in gland 221 can cause seal assembly 200 to move within gland 221. Depending on the system pressure 215 from the left and right sides of seal assembly 200 via gap 213 formed by housing 220 and shaft 18, sealing component 212, spring energizer 224, and filler 240 can slide within gland 221. That is, seal assembly 200 can shuttle back and forth in groove 221 when pressure direction changes. Depending upon the direction and amount of pressure, system pressure causes sealing component 212, including seal lips 222, arcuate portions 225 and 227, and/or the base portion 228 of sealing component 212, to flex or elastically deform and to thereby fill respectively cavities 242A, 242B, 242C, 242D, and/or 242E. As shown in FIGS. 3 and 4, cavities 242A and 242B are associated with the left sealing surface of sealing component 212 and correspondingly the left sealing surface of housing 220. Cavities 242D and 242E are associated with the right sealing surface of sealing component 212 and correspondingly the right sealing surface of housing 220. Cavity 242C is between seal lips 222. Venting (pressure release) can occur when one or more portions of seal element 212, such as respective seal lips 222 and/or arcuate portions 225, 227, flex or elastically deform inwardly, thereby putting pressure in the appropriate area to allow for venting. The sealing component is thus configured for moving left and right within the gland and for elastically deforming and thereby for sealing and permitting a pressure release. By providing sealing relative to the left side of seal assembly 200 or to the right side of seal assembly 200 (which can be the downstream side), as well as to the upper portion of seal assembly 200 and to the bottom portion of seal assembly 200, seal assembly 200 provides bi-directional sealing in high-pressure and/or high-temperature environments.

Now discussing generally the present invention as pertaining to the first embodiment, but also applicable to the other embodiments described above as well (one hundred series and two hundred series reference numbers not included for the sake of clarity), the particular structure is advantageous.

If needed, the construction of vent bores 28 and 30 also provide a collective surface area that promotes cooling of sealing assembly 10 as fluid circulates and flows through and along bores 28, 30.

The sealing assembly 10 disclosed herein employs, in one form, a polymer seal that internally creates both a sealing surface and a running surface inside the unit. The design, in one form, supports a journal/sliding motion and can be constructed as a consumable sealing assembly that does not wear on the surrounding hardware. The material construction may be selected to provide sealing properties that exhibit extremely low friction, leading to use of the sealing assembly as a replacement for down-hole sealing systems.

The sealing assembly 10 can function in service areas other than water, including but not necessarily limited to air, oil, and/or solvents, and particularly in aggressive environments including abrasive media.

Any suitable materials known to those skilled in the art may be used to fabricate sealing component 12 and rings 14, 16. For example, the components may be made from polymer and readily processed according to conventional manufacturing and fabrication techniques known to those skilled in the art. In addition to polymers, for example, the rings 14, 16 could be components which can be constructed as polymer or metal pieces that can be readily mated together.

Among the various advantageous features of sealing assembly 10, the design contains features that allow it to be self-cleaning, especially when exposed to an abrasive working environment. The features (e.g., bores 28, 30) in addition to pressure relief help expel/remove contamination that might otherwise abrade the seal lips and/or other mating surface.

Additionally, the installation-ready and robust design permits sealing in either axial direction in a single groove. Such bi-directional sealing is a distinction and improvement in the high pressure seal operational area of the present invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sealing assembly for a shaft, comprising:
   at least one spring energizer;
   a backup ring including a protuberance contacting said spring energizer, said protuberance having a plurality of crosscut interconnecting bores configured to relieve pressure during operation; and
   a sealing component, said at least one spring energizer configured for energizing said sealing component, said sealing component including:
      a first arcuate portion annularly disposed about the shaft, said first arcuate portion substantially contacting said spring energizer; and
      a second arcuate portion reversed from said first arcuate portion, annularly disposed about the shaft, and substantially contacting said spring energizer, a space between said first arcuate portion and said second arcuate portion substantially filled with said spring energizer and at least a portion of said protuberance.

2. The sealing assembly of claim 1, wherein the sealing assembly is configured for being disposed in one of a single gland, groove, and space of a housing.

3. The sealing assembly of claim 2, wherein the sealing assembly is configured for sealing in two axial directions in one of said single gland, groove, and space and is thereby configured for providing bi-directional sealing in a high-pressure seal operational area.

4. The sealing assembly of claim 3, wherein said sealing component is configured for elastically deforming and thereby for sealing and permitting a pressure release.

5. The sealing assembly of claim 3, wherein said spring energizer contains a through bore configured to relieve pressure during operation.

\* \* \* \* \*